US011407358B2

(12) United States Patent
Wikström et al.

(10) Patent No.: US 11,407,358 B2
(45) Date of Patent: Aug. 9, 2022

(54) METHOD AND CONTROL UNIT FOR REAR VIEW (71) Applicant: Scania CV AB, Södertälje (SE)

(72) Inventors: Fredrik Wikström, Södertälje (SE); Jonny Johansson, Grödinge (SE); Erik Dyrelius, Huddinge (SE); Per Back, Knivsta (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/772,757

(22) PCT Filed: Feb. 7, 2017

(86) PCT No.: PCT/SE2017/050108
§ 371 (c)(1),
(2) Date: May 1, 2018

(87) PCT Pub. No.: WO2017/138865
PCT Pub. Date: Aug. 17, 2017

(65) Prior Publication Data
US 2018/0319336 A1 Nov. 8, 2018

(30) Foreign Application Priority Data
Feb. 10, 2016 (SE) .................... 1650165-2

(51) Int. Cl.
*B60R 1/00* (2022.01)
*B60Q 9/00* (2006.01)
(Continued)

(52) U.S. Cl.
CPC .................. *B60R 1/00* (2013.01); *B60Q 9/00* (2013.01); *B60W 40/04* (2013.01); *G01S 7/04* (2013.01);
(Continued)

(58) Field of Classification Search
CPC ........ G08G 1/166; G08G 1/167; G08G 1/165; G02B 27/01; G02B 2027/0138;
(Continued)

(56) References Cited

U.S. PATENT DOCUMENTS 6,919,917 B1    7/2005 Janssen
7,046,822 B1 *  5/2006 Knoeppel ............. B60W 30/16
                                                        382/103
(Continued)

FOREIGN PATENT DOCUMENTS

AU    199898161 A1    12/1998
CN    102632839 A     8/2012
(Continued)

OTHER PUBLICATIONS

International Search Report for PCT/SE2017/050108 dated Apr. 28, 2017.
(Continued)

*Primary Examiner* — Hung Q Dang
(74) *Attorney, Agent, or Firm* — Moore & Van Allen PLLC; W. Kevin Ransom (57) ABSTRACT Method and control unit in a vehicle are provided for detecting and tracking an object. The method comprises detecting the object, situated outside a view of a device intended to display objects outside a driver's direct field of vision, by a sensor; and tracking the detected object by adjusting the sensor and outputting a representation of the detected object by said device.

9 Claims, 6 Drawing Sheets (51) Int. Cl.
*B60W 40/04* (2006.01)
*G01S 7/04* (2006.01)
*G01S 13/66* (2006.01)
*G01S 13/931* (2020.01)
*G08G 1/0962* (2006.01)
*G08G 1/16* (2006.01)
*G06V 20/56* (2022.01)

(52) U.S. Cl.
CPC ............ *G01S 13/66* (2013.01); *G01S 13/931* (2013.01); *G08G 1/0962* (2013.01); *G08G 1/166* (2013.01); *G08G 1/167* (2013.01); *B60R 2300/20* (2013.01); *B60R 2300/30* (2013.01); *B60R 2300/802* (2013.01); *B60R 2300/8093* (2013.01); *G01S 2013/9315* (2020.01); *G01S 2013/9323* (2020.01); *G01S 2013/9324* (2020.01); *G06V 20/56* (2022.01)

(58) Field of Classification Search
CPC ...... G02B 2027/014; G02B 2027/0187; G02B 27/0101; H04N 7/183; H04N 5/247; H04N 7/18; G06F 3/013; G06F 3/012; B60R 2300/11; B60R 2300/105; B60R 1/00; B60R 2300/8066; G06K 9/00805; G06K 9/3241; G06K 9/00845; G01S 2013/9314; G01S 13/867; G06T 19/006; G06T 2207/30252; G08B 21/06; A61B 5/11
See application file for complete search history.

(56) References Cited

U.S. PATENT DOCUMENTS

| | | | |
|---|---|---|---|
| 9,288,381 B2 | 3/2016 | Irie et al. | |
| 2005/0046696 A1 | 3/2005 | Lang et al. | |
| 2008/0055411 A1 | 3/2008 | Lee | |
| 2008/0231701 A1* | 9/2008 | Greenwood | B60R 1/00 348/148 |
| 2009/0179987 A1* | 7/2009 | Kim | G06T 3/40 348/142 |
| 2012/0062741 A1 | 3/2012 | Stimel, Jr. et al. | |
| 2013/0155534 A1 | 6/2013 | Sala et al. | |
| 2014/0132770 A1* | 5/2014 | Lee | B60R 1/00 348/148 |
| 2014/0176713 A1 | 6/2014 | Ho | |
| 2014/0214255 A1 | 7/2014 | Dolgov et al. | |
| 2014/0333770 A1 | 11/2014 | Baur | |
| 2017/0028921 A1* | 2/2017 | Asai | B60R 1/00 |
| 2017/0098132 A1* | 4/2017 | Yokota | G06K 9/00805 |
| 2017/0178498 A1* | 6/2017 | Mcerlean | B60K 35/00 |

FOREIGN PATENT DOCUMENTS

| | | |
|---|---|---|
| CN | 103781696 A | 5/2014 |
| DE | 202008006711 U1 | 8/2008 |
| EP | 1147032 B1 | 11/2006 |
| GB | 2265744 A | 10/1993 |
| JP | 2008254710 A | 10/2008 |
| KR | 20050036179 A | 4/2005 |
| KR | 100868415 B1 | 11/2008 |
| RU | 2573110 C1 | 1/2016 |
| WO | 2015178497 A1 | 11/2015 |

OTHER PUBLICATIONS

Written Opinion of the International Searching Authority for PCT/SE2017/050108 dated Apr. 28, 2017.
SCANIA CV AB, International Application No. PCT/SE2017/050108, International Preliminary Report on Patentability, dated Aug. 14, 2018.
SCANIA CV AB, European Application No. 17750518.7, Extended European Search Report, dated Jun. 5, 2019.
SCANIA CV AB, Russian Application No. 2018119507, Office Action, dated Apr. 23, 2019.
SCANIA CV AB, Korean Application No. 10-2018-7024931, Office Action, dated Jul. 30, 2019.
SCANIA CV AB, Chinese Application No. 201780004194.4, First Office Action, dated Oct. 12, 2020.
SCAIA CV AB, European Application No. 17750518.7, Communication pursuant to Article 94(3) EPC, dated Oct. 9, 2020.
SCANIA CV AB, European Application No. 17750518.7, Communication pursuant to Article 94(3) EPC, dated Feb. 19, 2021.
SCANIA CV AB, Chinese Patent Application No. 201780004194.4, Second Office Action, dated Jun. 10, 2021.

* cited by examiner

METHOD AND CONTROL UNIT FOR REAR VIEW

CROSS-REFERENCE TO RELATED APPLICATION(S)

This application is a National Stage Application (filed under 35 § U.S.C. 371) of PCT/SE2017/050108, filed Feb. 7, 2017 of the same title, which, in turn claims priority to Swedish Application No. 1650165-2 filed Feb. 10, 2016 of the same title; the contents of each of which are hereby incorporated by reference.

FIELD OF THE INVENTION

This document relates to a method and a control unit in a vehicle. More particularly, a method and a control unit is described, for detecting and tracking an object situated in a blind spot of a rear view mirror.

BACKGROUND OF THE INVENTION

There are areas around a vehicle that are not visible for the driver, neither by direct vision nor indirectly with the help of a mirror. These areas are sometimes referred to as "blind spots" of the driver. The problems with visibility is in particular substantial in heavy vehicles such as trucks, and in particular for trucks with trailers.

There is then a risk of an accident if the driver of the vehicle changes direction when an object is situated in such blind spot.

Various attempts have been made to solve this problem, e.g. by adding extra mirrors or by adding sensors, like e.g. cameras, covering the blind spots. Adding additional mirrors and/or sensors is however expensive. It is also difficult to install in a convenient way and present the information concerning coverage of the blind spot to the driver in a convenient manner. Further, additional vehicle external mirrors will add air resistance and thus also increase fuel consumption.

Another known solution is to use wide-angle mirrors/cameras. Thereby blind spots may be at least partly covered, but unfortunately wide-angle mirrors/cameras affect the perspective. Thereby objects situated close to the wide-angle mirror/camera seems bigger/closer than they are in reality, while objects situated further away seems smaller/more distant than they are in reality. Such distorted view may confuse or disorientate the driver, which may lead to accidents due to inappropriate driver reactions on discovered objects.

It is also known to replace a conventional rear view mirror of a vehicle with a camera and a display. An advantage is that air resistance may be reduced. However, the above discussed problems with blind spots are not solved by such replacement.

Documents DE202008006711, US20140333770, US20120062741 and US20080055411 all describes different systems where cameras are placed at the rear view mirrors (comprising reflecting elements), which cameras may be turned into different directions.

However, by adding cameras in addition to the reflecting elements, costs are increased.

Documents US20050046696 and US20140176713 discloses a reversing camera on a vehicle which may be turned. It is however not discussed how the reversing camera may be used to minimize or reduce blind spots of the driver.

It would thus be desired to improve rear view mirrors of vehicles in order to reduce problems associated with blind spots.

SUMMARY OF THE INVENTION

It is therefore an object of this invention to solve at least some of the above problems and improve the traffic security.

According to a first aspect of the invention, this objective is achieved by a method in a vehicle for detecting and tracking an object. The method comprises detecting the object, situated outside a view of a device intended to display objects outside a driver's direct field of vision, by a sensor. The method further comprises tracking the detected object by adjusting the sensor and outputting a representation of the detected object by said device.

According to a second aspect of the invention, this objective is achieved by a control unit in a vehicle. The control unit aims at detecting and tracking an object. The control unit is configured to detect the object, situated outside a view of a device intended to display objects outside a driver's direct field of vision, based on signals received from a sensor. The control unit is also configured to generate control signals for tracking the detected object with the sensor and also generate control signals for outputting a representation of the detected object by said device.

Thanks to the described aspects, by adjusting the direction of a side sensor and thereby the view seen by the driver in the presentational device intended to display objects outside a driver's direct field of vision, the problems with objects appearing outside the current view of the presentational device. By redirecting the sensor without widening the viewing angle, a blind spot of the driver could be visualized by the presentational device without changing the viewing perspective. It is thereby easier for the driver to correctly estimate the distance between the own vehicle and the detected object. Also, by widening up the viewing angle of the sensor, a broader area may be covered and a situation where a plurality of objects is situated behind and/or at the side of the vehicle may be presented for the driver. Further, the presented solution may be realized without addition of sensors, besides sensors already provided on the vehicle for other purposes. Thereby the problems of blind spots around the vehicle may be eliminated or at least reduced without increased sensor costs. Thus increased traffic security is achieved.

Other advantages and additional novel features will become apparent from the subsequent detailed description.

BRIEF DESCRIPTION OF THE DRAWINGS

Embodiments of the invention will now be described in further detail with reference to the accompanying figures, in which.

DETAILED DESCRIPTION OF THE INVENTION

Embodiments of the invention described herein are defined as a method and a control unit, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
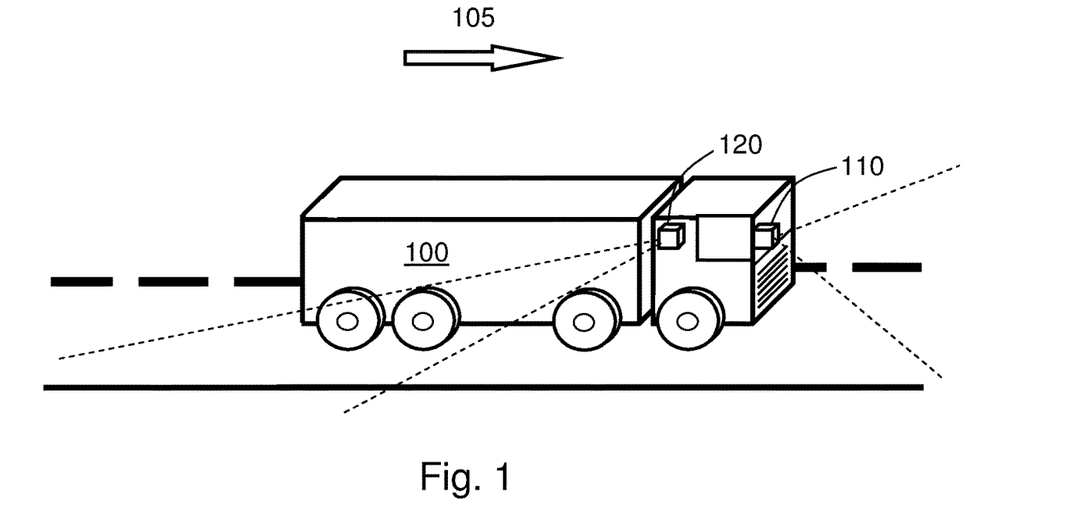
FIG. 1 illustrates a vehicle according to an embodiment of the invention.

FIG. 1 illustrates a scenario with a vehicle 100. The vehicle 100 is driving on a road in a driving direction 105.

The vehicle 100 may comprise e.g. a truck, a bus or a car, or any similar vehicle or other means of conveyance.

The vehicle 100 may optionally comprise a forwardly directed sensor 110 in some embodiments. In the illustrated embodiment, which is merely an arbitrary example, the forwardly directed sensor 110 may be situated e.g. at the front of the vehicle 100, behind the windscreen of the vehicle 100.

Mounting the forwardly directed sensor 110 behind the windshield have some advantages compared to externally mounted camera systems. These advantages include the possibility to use windshield wipers for cleaning and using the light from headlights to illuminate objects in the camera's field of view. It is also protected from dirt, snow, rain and to some extent also from damage, vandalism and/or theft. Such sensor 110 may also be used for a variety of other tasks.

The optional sensor 110 may be directed towards the front of the vehicle 100, in the driving direction 105. The sensor 110 may comprise e.g. a camera, a stereo camera, an infrared camera, a video camera, a radar, a lidar, an ultrasound device, a time-of-flight camera, or similar device, in different embodiments.

Further the vehicle 100 may comprise one or two side view sensors 120. The side view sensors 120 may be situated at the left/right sides of the vehicle 100 (as regarded in the driving direction 105), arranged to detect objects at the respective side of the vehicle 100. The side view sensor 120 may comprise e.g. a camera, a stereo camera, an infrared camera, a video camera, a radar, a lidar, an ultrasound device, a time-of-flight camera, or similar device in different embodiments.

Instead of using traditional rear view mirrors on the vehicle 100, side view sensors 120 in combination with one or more devices intended to display objects outside a driver's direct field of vision may be used. Such presentational device may comprise e.g. a display, a projector, a Head-Up Display, a transparent display being part of the windshield, intelligent glasses of the driver, etc., which output an image, or stream of images, captured by a corresponding sensor 110, 120. Typically, the sensor 120 on the left side of the vehicle 100 may be associated with a presentational device on the left side of the cabin while the sensor on the right side of the vehicle 100 may be associated with a presentational device on the right side of the cabin, even if other combinations are possible.

However, such presentational device intended to display objects outside a driver's direct field of vision may in some embodiments comprise a reflecting element such as e.g. represented by a (rear view) mirror.

The sensors 110, 120 may be turned and/or re-directed in different directions and the devices intended to display objects outside a driver's direct field of vision may present the adjusted view of the associated sensor 110, 120.

The side view sensors 120 may according to some embodiments be directed based on information captured by the sensors 120, which information may be analysed for detecting how surrounding objects are moving in relation to the vehicle 100. Thereby, the side view sensor 120 may identify e.g. if another vehicle is on its way to disappear into a blind spot of the driver, around the vehicle 100.

It is thereby possible to utilize side view sensors 120/ presentation devices with a normal viewing angle and instead follow the detected and identified object, for minimizing or at least reducing the risk that the driver does not detect the other vehicle. In some alternative embodiments, e.g. when changing direction is not enough, the viewing angle may be changed into a wider angle.

In some embodiments, the forwardly directed sensor 110 (which also may be used e.g. for lane departure warning etc.), or other sensors on the vehicle 100 may be utilized for identifying objects. Thereby also vehicles which are ahead of the vehicle 100 and which are overtaken may be identified. This information may be used for adjusting the direction of one of the side sensors 120 when this vehicle becomes situated outside the current, or default view of the device intended to display objects outside a driver's direct field of vision.

Further, according to some embodiments, several sensors 110, 120, such as e.g. cameras may be directed into the same direction, or into the same object. Thereby, based upon the various sensor signals from the different sensors 110, 120, a three dimensional image may be created and stationary objects may be identified. The sensors 110, 120 may then be directed in that direction in case the driver is on his/her way of driving into that identified object. This may be useful e.g. when driving backwards or when parking the vehicle 100.

Further, in some embodiments, a detected object around the vehicle 100 may be indicated on an overview presentation, e.g. on a display in the cabin, or in any of the presentational devices.

An advantage with the presented solution is that it is possible to utilize a sensor 110, 120 and a presentational device having a viewing angle which does not change perspective when trying to avoid, reduce or minimize blind spots of the driver around the vehicle 100. Further, increased costs due to additional sensors may be avoided by using already existing sensors 110, 120 on the vehicle 100. Traffic security is thereby enhanced.

Figure 2A:
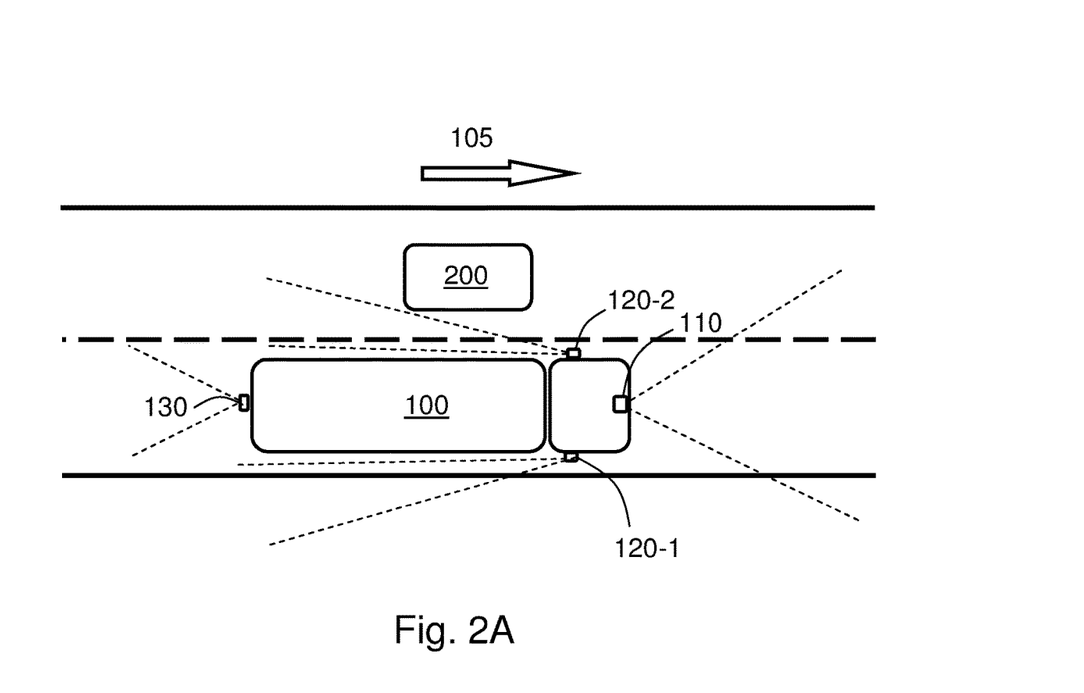
FIG. 2A illustrates an example of a traffic scenario and an embodiment of the invention.

FIG. 2A schematically illustrates a scenario, similar to the previously discussed scenario illustrated in FIG. 1, but with the vehicle 100 seen from an above perspective and wherein an object 200 is depicted.

The object 200 may be a vehicle, a human, an animal, a lamp post or e.g. any imaginable item.

When the vehicle 100 is driving in the driving direction 105, the forward directed sensor 110 may detect the object 200 in this illustrated scenario, when the vehicle 100 is approaching the object 200 from behind. An image recognition program may recognize the object 200 and categorize it as e.g. pedestrian, car, bicyclist, animal, lamp post etc.; or into stationary/non-stationary objects 200, for example, in some embodiments.

Information concerning the detected and possibly identified object 200 may then be utilized, also when the object 200 is no longer within capture range of the forward directed sensor 110, according to some embodiments.

In other embodiments, the object 200 may be approaching the vehicle 100 from behind and overtaking the vehicle 100. The reverse sensor 130 may then be utilized for the above described detection and recognition.

As the vehicle 100 is driving forward in the driving direction 105, the object 200 becomes situated in a blind spot where it is neither possible for the driver to see it directly, by the forward looking sensor 110 nor by the side looking sensor 120-2 and the corresponding presentational device.

It may be noted that the vehicle 100 may have additional sensors such as reversing camera 130, in some embodiments, which may be utilized for the same purpose as the forward directed sensor 110 when driving backwards, in some embodiments.

Figure 2B:
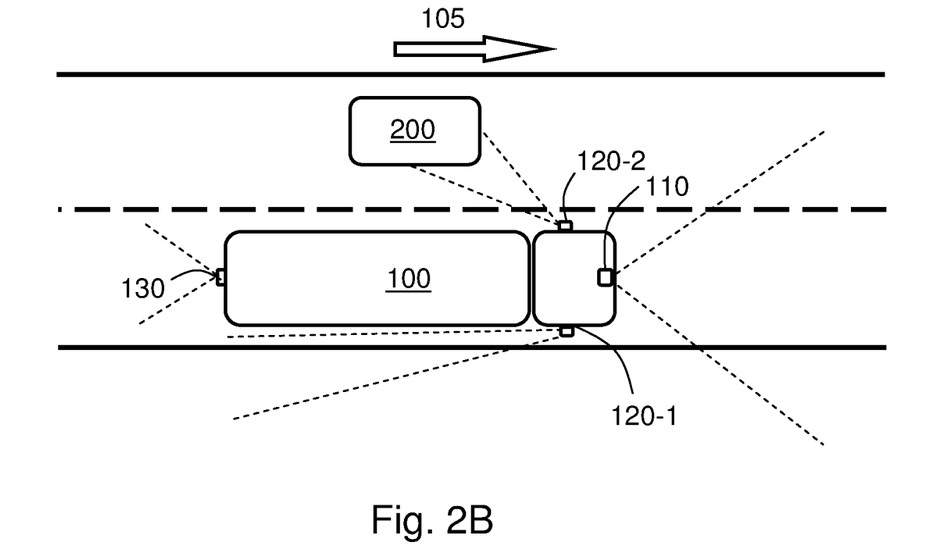
FIG. 2B illustrates an example of a traffic scenario and an embodiment of the invention.

FIG. 2B illustrates a moment in time right after the scenario illustrated in FIG. 2A.

The side looking sensor 120-2 on the left side of the vehicle 100 in the direction of travel 105 is directionally adjusted to cover the object 200 which was situated outside a current or default view of the device intended to display objects 200 outside a driver's direct field of vision in the scenario of FIG. 2A.

The default view of the side looking sensor 120-2 and the corresponding device may be in a configurable rear view position.

Thus the detected object 200 may be tracked by the adjusted sensor 120-2 and a representation of the detected object 200 may be outputted by the presentation device associated with the sensor 120-2.

Thereby, the driver becomes aware of the object 200 at the left side of the own vehicle 100 and is enabled to continue the driving with that vehicle in mind. By maintaining the same viewing angle of the sensor 120-2 and the presentational device, distance estimation of the object 200 in relation to the own vehicle 100 is facilitated for the driver.

Further, in some embodiments, the side looking sensor 120-2 and the corresponding device may return to the default view in some embodiments, e.g. when the detected object 200 no longer is situated at the side of the vehicle 100 and/or when another object enters the zone at the left side of the vehicle 100.

Figure 2C:
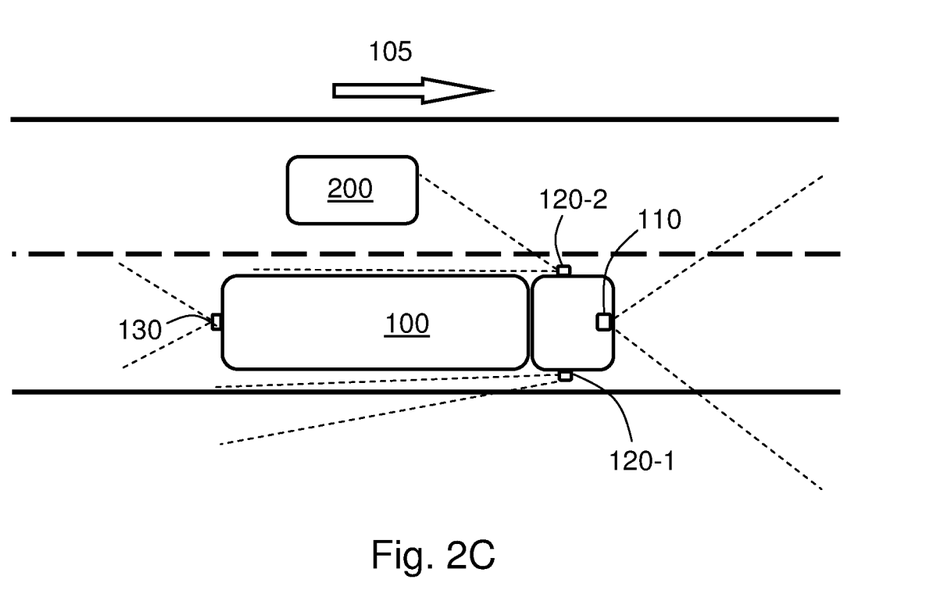
FIG. 2C illustrates an example of a traffic scenario and an embodiment of the invention.

FIG. 2C illustrates yet a moment in time right after the scenario illustrated in FIG. 2A, alternative to the scenario illustrated in FIG. 2B.

The side looking sensor 120-2 on the left side of the vehicle 100 is adjusted to cover the object 200 which was situated in the blind spot in the scenario of FIG. 2A by adjustment of the viewing angle.

Thus the detected object 200 may be tracked by the adjusted sensor 120-2 and a representation of the detected object 200 may be outputted by the presentation device associated with the sensor 120-2, having the same adjusted viewing angle.

In some embodiments, the side looking sensor 120-2 and the corresponding presentational device may return to a default viewing angle in some embodiments, e.g. when the detected object 200 no longer is situated at the side of the vehicle 100.

Figure 2D:
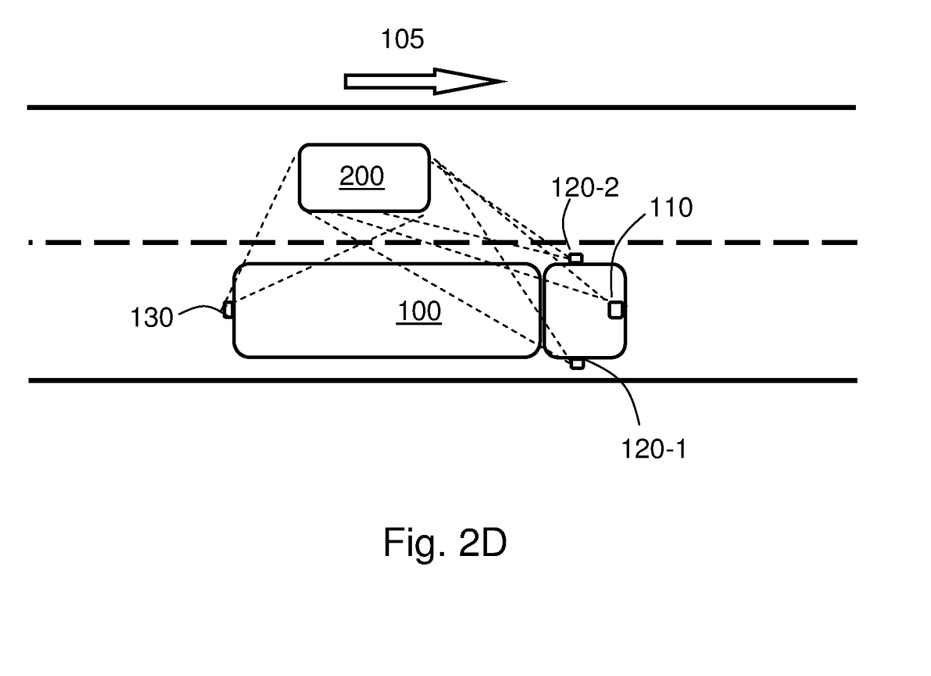
FIG. 2D illustrates an example of a traffic scenario and an embodiment of the invention.

FIG. 2D illustrates yet a scenario according to an embodiment, in a moment in time after the scenario illustrated in FIG. 2A.

By directing a plurality of sensors 110, 120-1, 120-2, 130 towards the object 200, simultaneously or shifted in time, a three Dimensional (3D) image of the object 200 may be rendered, which may be outputted e.g. by the presentational device, or on a separate display etc. in different embodiments, e.g. when the vehicle 100 is moving in the direction where the object 200 is situated.

This may be an advantage, perhaps in particular when navigating in narrow rooms, when parking, when driving in the reverse direction, etc., as the driver may be provided an improved representation of the object 200.

Figure 3:
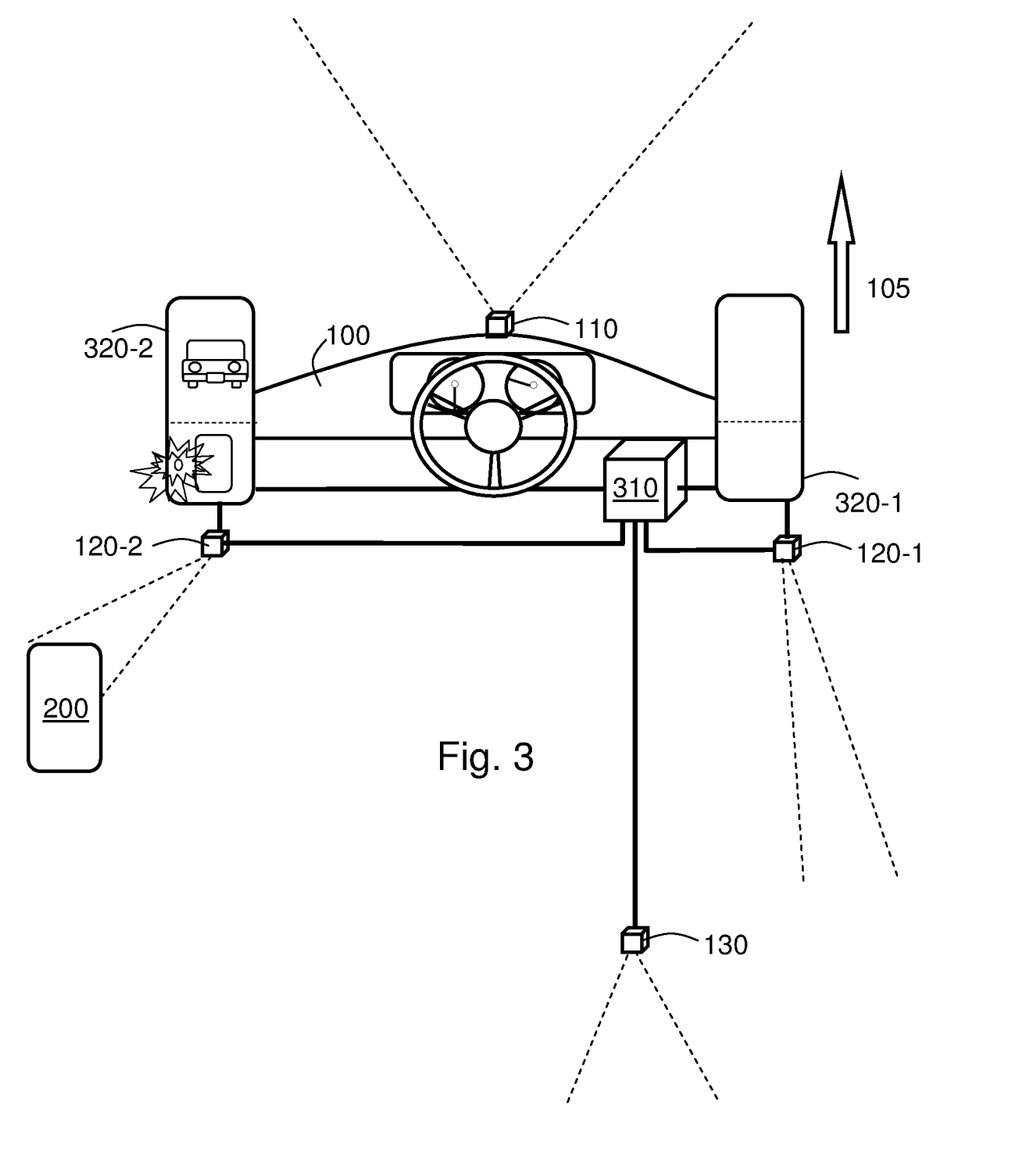
FIG. 3 illustrates an example of a vehicle interior according to an embodiment.

FIG. 3 illustrates an example of a vehicle interior of the vehicle 100 and depicts how the previously scenario in FIG. 1 and/or FIG. 2A-2D may be perceived by the driver of the vehicle 100.

The vehicle 100 comprises a control unit 310, a right side device 310-1 intended to display objects 200 outside a driver's direct field of vision, situated on the right side of the vehicle 100, and a left side device 310-2 intended to display objects 200 outside a driver's direct field of vision, situated on the left side of the vehicle 100. Each such device 310-1, 310-2 is associated with a respective sensor 120-1, 120-2, situated on the corresponding side of the vehicle 100. The sensors 120-1, 120-2 may typically comprise a respective (video) camera.

However, in other embodiments, the vehicle 100 may comprise a plurality of sensors 120 on each side of the vehicle 100. The sensors 120 may be of the same, or different types, such as e.g. a camera, a stereo camera, an infrared camera, a video camera, a radar, a lidar, an ultrasound device, a time-of-flight camera, or similar device in different embodiments.

The control unit 310 is able to detect the object 200, situated out of the "normal", default, or currently utilized view in the left presentational device 320-2, based on sensor signals provided by the left side sensor 120-2. Also, the control unit 310 is further configured to generate control signals for tracking the detected object 200 by adjusting the sensor 120-2 and outputting a representation of the detected object 200 by said device 320-2. In the illustrated example, the left side sensor 120-2 is redirected from the "normal", or default coverage area into the area where the object 200 is situated. The view of the redirected sensor 120-2 is then displayed in the left presentational device 320-2. Further, in some embodiments, a schematic overview illustration of the vehicle 100 and the area where the object 200 is situated may be outputted on any presentational device 320-1, 320-2 in the vehicle 100, e.g. in the left presentational device 320-2. Thereby the attention of the driver is put to the fact that the left presentational device 320-2 has an adjusted coverage area, in comparison with the default coverage area.

In other embodiments, the coverage area of the left presentational device 320-2/left side sensor 120-2 may be adjusted by adjustment of the viewing angle of the left presentational device 320-2/left side sensor 120-2. Typically, a wider viewing angle may be applied.

As the object 200 moves in relation to the vehicle 100, the control unit 310 may track the object via the left presentational device 320-2 and the corresponding sensor 120-2.

In some embodiments, when an object 200 is detected in a blind spot of the driver when the presentational devices 320-1, 320-2/side sensors 120-1, 120-2 are in normal/default position, the driver's attention may be caught, besides tracking the object 200 with said devices 320-1, 320-2/side sensors 120-1, 120-2, by an audio signal, light signal, haptic signal etc.

Thereby the risk of an accident due to an object 200 appearing in a blind spot of the driver is reduced, as the driver is made aware of the object 200 and its position in relation to the own vehicle 100.

In the illustrated embodiment, the vehicle 100 also comprises an optional forwardly directed sensor 110 situated in front of the vehicle 100 behind the windscreen. Further, in some embodiments the vehicle 100 may comprise a reversing camera 130 situated at the rear part of the vehicle 100, directed in a direction opposite to the normal driving direction 105. Thus detection of objects 200 may be made behind the vehicle 100, e.g. while backing the vehicle 100. The camera 110 may in such case be situated inside the rear glass, in order to be protected from dirt, snow, etc.

The control unit 310 may communicate with the sensors 110, 120-1, 120-2, 130, e.g. via a communication bus of the vehicle 100, or via a wired or wireless connection.

Figure 4:
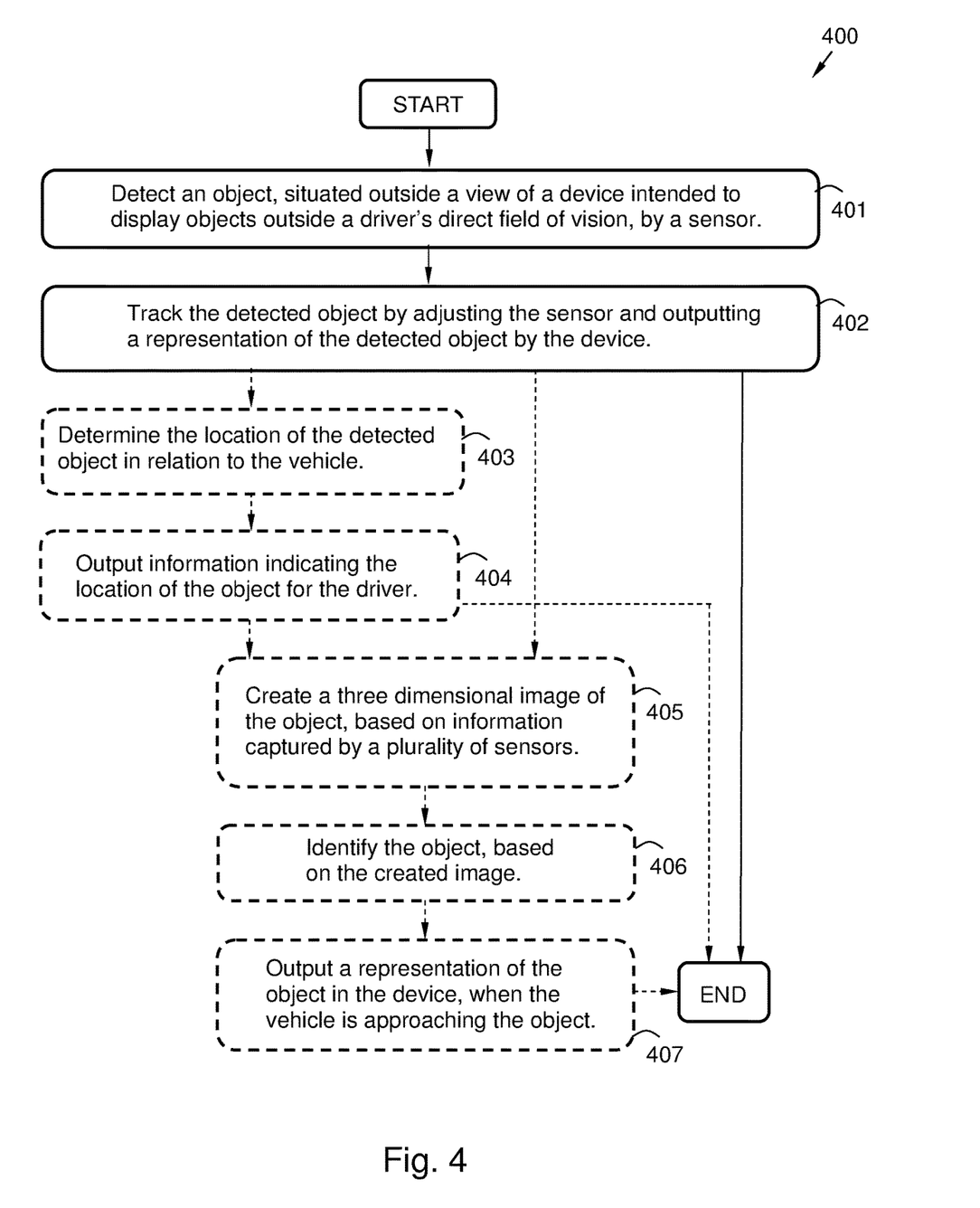
FIG. 4 is a flow chart illustrating an embodiment of the method.

FIG. 4 illustrates an example of a method 400 according to an embodiment. The flow chart in FIG. 4 shows the method 400 for use in a vehicle 100. The method 400 aims at detecting and tracking an object 200 situated outside a default view of a presentational device 320-1, 320-2 intended to display objects 200 outside the driver's direct field of vision, such as e.g. in a blind spot of a rear view mirror of the vehicle 100.

The vehicle 100 may be e.g. a truck, a bus, a car, or similar means of conveyance.

The vehicle 100 may comprise a plurality of sensors 110, 120-1, 120-2, 130, pointable towards the object 200, in some embodiments, simultaneously, shifted or sequentially in time.

In order to correctly be able to detect and track the object 200, the method 400 may comprise a number of steps 401-407. However, some of these steps 401-407 may be performed in various alternative manners. Some method steps may only be performed in some optional embodiments; such as e.g. steps 403-407. Further, the described steps 401-407 may be performed in a somewhat different chronological order than the numbering suggests. The method 400 may comprise the subsequent steps:

Step 401 comprises detecting the object 200, situated outside the default view of the device 320-1, 320-2 intended to display objects 200 outside a driver's direct field of vision, by a sensor 110, 120-1, 120-2, 130.

Step 402 comprises tracking the detected 401 object 200 by adjusting the sensor 110, 120-1, 120-2, 130 and outputting a representation of the detected object 200 by the device 320-1, 320-2 intended to display objects 200 outside a driver's direct field of vision, by a sensor 110, 120-1, 120-2, 130.

The adjustment of the sensor 110, 120-1, 120-2, 130 may comprise turning the sensor 110, 120-1, 120-2, 130, in some embodiments.

In some embodiments, the adjustment of the sensor 110, 120-1, 120-2, 130 may comprise widening the viewing angle of the sensor 110, 120-1, 120-2, 130.

Step 403 which only may be performed in some particular embodiments, comprises determining the location of the detected 401 object 200 in relation to the vehicle 100.

Step 404 which only may be performed in some particular embodiments wherein step 403 has been performed, comprises outputting information indicating the determined 403 location of the detected 401 object 200 for the driver.

Step 405 which only may be performed in some particular embodiments, comprises creating a three dimensional image of the object 200, based on information captured by the plurality of sensors 110, 120-1, 120-2, 130.

Step 406 which only may be performed in some particular embodiments wherein step 405 has been performed, comprises identifying the object 200, based on the created 405 image, based on image recognition.

Step 407 which only may be performed in some particular embodiments wherein step 405 and step 406 has been performed, comprises outputting a representation of the object 200 in said device 320-1, 320-2, when the vehicle 100 is approaching the object 200.

Figure 5:
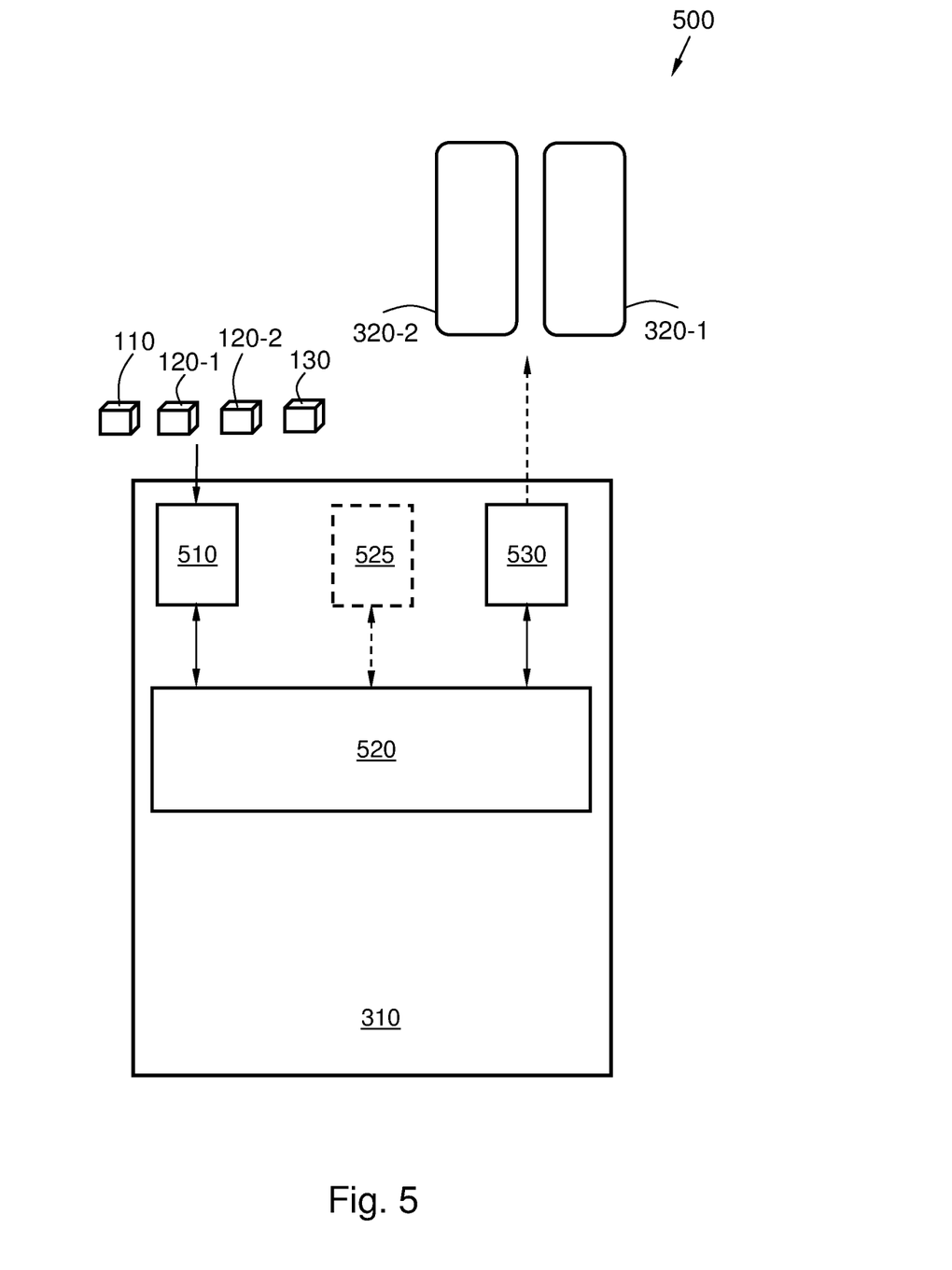
FIG. 5 is an illustration depicting a system according to an embodiment.

FIG. 5 illustrates an embodiment of a system 500 in a vehicle 100 for detecting and tracking an object 200. The system 500 may perform at least some of the previously described steps 401-407 according to the method 400 described above and illustrated in FIG. 4.

The system 500 comprises at least one control unit 310 in the vehicle 100, for detecting and tracking an object 200. The control unit 310 is configured to detect the object 200, situated outside a default view of a device 320-1, 320-2 intended to display objects 200 outside a driver's direct field of vision, based on signals received from a sensor 110, 120-1, 120-2, 130. Further, the control unit 310 is configured to generate control signals for tracking the detected object 200 with the sensor 110, 120-1, 120-2, 130. Also, the control unit 310 is configured to generate control signals for outputting a representation of the detected object 200 by said device 320-1, 320-2.

Further the control unit 310 may be configured to determine the location of the detected object 200 in relation to the vehicle 100, based on received sensor signals. In addition, the control unit 310 may be configured to generate control signals for outputting information indicating the determined location of the detected object 200 for the driver.

In some embodiments, wherein the vehicle 100 comprises a plurality of sensors 110, 120-1, 120-2, 130, pointable towards the object 200, the control unit 310 may be further configured to create a three dimensional image of the object 200, based on information received from the plurality of sensors 110, 120-1, 120-2, 130. Further, the control unit 310 may be configured to identify the object 200, based on the created image. The control unit 310 may also be configured to classify the detected object 200 based on image recognition in some embodiments. Furthermore, the control unit 310 may also be configured to generate control signals for outputting a representation of the object 200 in the device 320-1, 320-2 intended to display objects 200 outside the driver's direct field of vision, when the vehicle 100 is approaching the object 200.

The control unit 310 comprises a receiving circuit 510 configured for receiving a signal from the sensors 110, 120-1, 120-2, 130.

Further, the control unit 310 comprises a processor 520 configured for performing at least some steps of the method 400, according to some embodiments.

Such processor 520 may comprise one or more instances of a processing circuit, i.e. a Central Processing Unit (CPU), a processing unit, a processing circuit, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the control unit 310 may comprise a memory 525 in some embodiments. The optional memory 525 may comprise a physical device utilized to store data or programs, i.e., sequences of instructions, on a temporary or permanent basis. According to some embodiments, the memory 525 may comprise integrated circuits comprising silicon-based transistors. The memory 525 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 310 may comprise a signal transmitter 530 in some embodiments. The signal transmitter 530 may be configured for transmitting a signal to e.g. the presentational device 320-1, 320-2, a display device, or a warning system or warning device, for example.

In addition, the system 500 also comprises at least one sensor 110, 120-1, 120-2, 130 of the vehicle 100, for detecting the object 200 situated outside a default view of a device 320-1, 320-2 intended to display objects outside a driver's direct field of vision. The sensor 110, 120-1, 120-2, 130 may comprise e.g. a camera, a stereo camera, an infrared camera, a video camera, radar, lidar, ultrasonic sensor, time-of-flight camera, or thermal camera or similar. The sensor 110, 120-1, 120-2, 130 utilized for performing at least a part of the method 400 may in some embodiments have another main purpose than performing the method 400, i.e. be already existing in the vehicle 100.

Further the system 500 also comprises at least one device 320-1, 320-2 intended to display objects 200 outside the driver's direct field of vision.

The above described steps 401-407 to be performed in the vehicle 100 may be implemented through the one or more processors 520 within the control unit 310, together with computer program product for performing at least some of the functions of the steps 401-407. Thus a computer program product, comprising instructions for performing the steps 401-407 in the control unit 310 may perform the method 400 comprising at least some of the steps 401-407 for detecting and tracking the object 200, when the computer program is loaded into the one or more processors 520 of the control unit 310.

Further, some embodiments of the invention may comprise a vehicle 100, comprising the control unit 310, for detecting and tracking an object 200, according to at least some of the steps 401-407.

The computer program product mentioned above may be provided for instance in the form of a data carrier carrying computer program code for performing at least some of the steps 401-407 according to some embodiments when being loaded into the one or more processors 520 of the control unit 310. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the control unit 310 remotely, e.g., over an Internet or an intranet connection.

The terminology used in the description of the embodiments as illustrated in the accompanying drawings is not intended to be limiting of the described method 400; the control unit 310; the computer program; the system 500 and/or the vehicle 100. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A method in a vehicle for detecting and tracking an object when the vehicle is driven on a road in a driving direction, wherein the method comprises:
   detecting, by at least one first sensor, a presence of an object situated either in front of or behind the vehicle, wherein the object is another vehicle driving in the driving direction;
   capturing images of the object using the at least one first sensor;
   recognizing the object as another vehicle using an image recognition program based on the captured images;
   outputting a representation of the detected object to a presentation device as an image on said presentation device;
   detecting that the object has moved to a position that is no longer within a capture range of the at least one first sensor;
   adjusting at least one second sensor having a default view of a rear side of the vehicle, based on said detection, to thereby track the detected object with the at least one second sensor so as to maintain the object within the view of the presentation device, wherein adjusting comprises at least altering a viewing angle of the at least one second sensor from its default rear side view to a view angle that captures images of the object as the object moves in the driving direction; and
   maintaining a viewing angle of the presentation device and the viewing angle of the at least one second sensor to be the same, so that a distance estimation of the object in relation to the vehicle may be observed by the user based on a display of the object on the presentation device as the object moves in the driving direction from a position either in front of or behind the vehicle to a position at a side of the vehicle.

2. The method according to claim 1, wherein the adjustment of the at least one second sensor comprises turning the at least one second sensor.

3. The method according to claim 1, wherein the adjustment of the at least one second sensor comprises widening the viewing angle of the at least one second sensor.

4. The method according to claim 1 further comprising:
determining the location of the detected object in relation to the vehicle; and
outputting information indicating the determined location of the detected object for the driver.

5. The method according to claim 1 further comprising:
outputting an image of the detected object to a first portion of a display of said presentation device;
adjusting the at least one second sensor having a default view of a rear side of the vehicle to thereby track the detected object with the at least one second sensor so as to maintain a view of the object on the first portion of the presentation device;
maintaining a viewing angle associated with the first portion of the presentation device and the viewing angle of the at least one second sensor to be the same; and
outputting on a second portion of the display of the presentation device a schematic overview illustration of the vehicle and an area where the object is situated to thereby indicate that the first portion of the display of the presentation device has been adjusted to track the object.

6. A control unit in a vehicle for detecting and tracking an object when the vehicle is driven on a road in a driving direction, wherein the control unit is configured to:
detect a presence of an object situated either in front of or behind the vehicle, based on signals received from the at least one first sensor, wherein the object is another vehicle driving in the driving direction;
capture images of the object using the at least one first sensor;
recognize the object as another vehicle using an image recognition program based on the captured images; and
generate control signals for outputting a representation of the detected object to an presentation device as an image on said presentation device;
generate control signals for adjusting at least one second sensor having a default view of a rear side of the vehicle, based on said detection, to thereby track the detected object with the at least one second sensor so as to maintain the object within the view of the presentation device, wherein adjusting comprises at least altering a viewing angle of the at least one second sensor from its default rear side view to a view angle that captures images of the object as the object moves in the driving direction; and
generate control signals for maintaining a viewing angle of the presentation device and the viewing angle of the at least one second sensor to be the same, so that a distance estimation of the object in relation to the vehicle may be observed by the user based on a display of the object on the presentation device as the object moves in the driving direction from a position either in front of or behind the vehicle to a position at a side of the vehicle.

7. The control unit according to claim 6, further configured to:
determine the location of the detected object in relation to the vehicle, based on received sensor signals from at least one of the first or second sensors; and
generate control signals for outputting information on the presentation device indicating the determined location of the detected object for the driver.

8. A computer program product comprising computer program code stored on a non-transitory computer-readable medium, said computer program product for detecting and tracking an object relative to a vehicle when the vehicle is driven on a road in a driving direction, said computer program product comprising computer instructions to cause one or more computer processors to perform the following operations:
detecting, by at least one first sensor, a presence of an object situated either in front of or behind the vehicle, wherein the object is another vehicle driving in the driving direction;
capturing images of the object using the at least one first sensor;
recognizing the object as another vehicle using an image recognition program based on the captured images;
outputting a representation of the detected object to a presentation device as an image on said presentation device;
detecting that the object has moved to a position that is no longer within a capture range of the at least one first sensor;
adjusting at least one second sensor having a default view of a rear side of the vehicle, based on said detection, to thereby track the detected object with the at least one second sensor so as to maintain the object within the view of the presentation device, wherein adjusting comprises at least altering a viewing angle of the at least one second sensor from its default rear side view to a view angle that captures images of the object as the object moves in the driving direction; and
maintaining a viewing angle of the presentation device and the viewing angle of the at least one second sensor to be the same, so that a distance estimation of the object in relation to the vehicle may be observed by the user based on a display of the object on the presentation device as the object moves in the driving direction from a position either in front of or behind the vehicle to a position at a side of the vehicle.

9. A system in a vehicle for detecting and tracking objects when the vehicle is driven on a road in a driving direction, which system comprises:
at least one presentation device;
a set of sensors, for detecting a presence of an; and
a control unit configured to detect the object based on signals received from the set of sensors and generate control signals for:
detecting, by at least one first sensor, a presence of an object situated either in front of or behind the vehicle, wherein the object is another vehicle driving in the driving direction;
capturing images of the object using the at least one first sensor;
recognizing the object as another vehicle using an image recognition program based on the captured images;
outputting a representation of the detected object to a presentation device as an image on said presentation device;
detecting that the object has moved to a position that is no longer within a capture range of the at least one first sensor;
adjusting at least one second sensor having a default view of a rear side of the vehicle, based on said detection, to thereby track the detected object with the at least one second sensor so as to maintain the object within the view of the presentation device, wherein adjusting comprises at least altering a viewing angle of the at least one second sensor from its default rear side view to a view angle that captures images of the object as the object moves in the driving direction; and maintaining a viewing angle of the presentation device and the viewing angle of the at least one second sensor to be the same, so that a distance estimation of the object in relation to the vehicle may be observed by the user based on a display of the object on the presentation device as the object moves in the driving direction from a position either in front of or behind the vehicle to a position at a side of the vehicle.

\* \* \* \* \*